(12) United States Patent
Bruno et al.

(10) Patent No.: US 11,511,867 B2
(45) Date of Patent: Nov. 29, 2022

(54) MIXING RAM AND BLEED AIR IN A DUAL ENTRY TURBINE SYSTEM

(71) Applicant: Hamilton Sundstrand Corporation, Charlotte, NC (US)

(72) Inventors: Louis J. Bruno, Ellington, CT (US); Harold W. Hipsky, Willington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/604,481

(22) Filed: May 24, 2017

(65) Prior Publication Data

US 2017/0341764 A1    Nov. 30, 2017

Related U.S. Application Data

(60) Provisional application No. 62/341,851, filed on May 26, 2016.

(51) Int. Cl.
| | | |
|---|---|---|
| *B64D 13/08* | (2006.01) | |
| *B64D 13/06* | (2006.01) | |
| *F02C 6/08* | (2006.01) | |
| *B64D 13/02* | (2006.01) | |
| *F01D 5/06* | (2006.01) | |
| *F04D 25/04* | (2006.01) | |
| *F04D 29/053* | (2006.01) | |

(Continued)

(52) U.S. Cl.
CPC ............. *B64D 13/08* (2013.01); *B64D 13/02* (2013.01); *B64D 13/06* (2013.01); *F01D 1/023* (2013.01); *F01D 5/06* (2013.01); *F02C 6/08* (2013.01); *F04D 25/045* (2013.01); *F04D 29/053* (2013.01); *F04D 29/325* (2013.01); *B64D 2013/0618* (2013.01); *B64D 2013/0688* (2013.01); *Y02T 50/50* (2013.01)

(58) Field of Classification Search
USPC .................................................. 417/62, 244
See application file for complete search history.

(56) References Cited

U.S. PATENT DOCUMENTS

| | | | |
|---|---|---|---|
| 2,800,002 | A | 7/1957 | Seed |
| 2,909,323 | A | 10/1959 | Cholvin et al. |
| 2,930,205 | A | 3/1960 | Walker |

(Continued)

FOREIGN PATENT DOCUMENTS

| | | |
|---|---|---|
| CA | 2034371 A1 | 10/1991 |
| CA | 2968745 A1 | 11/2017 |

(Continued)

OTHER PUBLICATIONS

Search Report dated Oct. 5, 2017 in European Patent Application No. 17173077.

(Continued)

*Primary Examiner* — Essama Omgba
*Assistant Examiner* — Geoffrey S Lee
(74) *Attorney, Agent, or Firm* — Cantor Colburn LLP

(57) ABSTRACT

An air cycle machine is provided. The air cycle machine can be included an environmental control system of an aircraft. The air cycle machine can include a turbine comprising a plurality of inlet gas flow paths, a compressor driven by the turbine from a shaft, and a fan driven by the turbine from the shaft.

18 Claims, 11 Drawing Sheets

(51) Int. Cl.
  *F01D 1/02* (2006.01)
  *F04D 29/32* (2006.01)

(56) References Cited

U.S. PATENT DOCUMENTS

| | | | |
|---|---|---|---|
| 3,010,697 A | 11/1961 | Lazo et al. | |
| 3,137,477 A | 6/1964 | Kofink | |
| 3,177,676 A | 4/1965 | Abrahams | |
| 3,428,242 A * | 2/1969 | Rannenberg | B64D 13/06 415/180 |
| 4,021,215 A * | 5/1977 | Rosenbush | B64D 13/06 62/402 |
| 4,261,416 A * | 4/1981 | Hamamoto | B64D 13/06 165/271 |
| 4,283,924 A | 8/1981 | Schutze | |
| 4,374,469 A | 2/1983 | Rannenberg | |
| 4,419,926 A | 12/1983 | Cronin et al. | |
| 4,546,939 A | 10/1985 | Cronin | |
| 4,604,028 A | 8/1986 | Yeaple et al. | |
| 4,875,345 A | 10/1989 | Signoret | |
| 5,014,518 A | 5/1991 | Thomson et al. | |
| 5,086,622 A | 2/1992 | Warner | |
| 5,125,597 A | 6/1992 | Coffinberry | |
| 5,136,837 A | 8/1992 | Davison | |
| 5,180,278 A | 1/1993 | Warner | |
| 5,299,763 A * | 4/1994 | Bescoby | B64D 13/06 244/118.5 |
| 5,461,882 A | 10/1995 | Zywiak | |
| 5,473,899 A | 12/1995 | Viteri | |
| 5,482,229 A * | 1/1996 | Asshauer | B64D 13/06 244/118.5 |
| 5,704,218 A | 1/1998 | Christians et al. | |
| 5,709,103 A | 1/1998 | Williams | |
| 5,887,445 A | 3/1999 | Murry et al. | |
| 5,899,085 A | 5/1999 | Williams | |
| 5,911,388 A | 6/1999 | Severson et al. | |
| 5,956,960 A | 9/1999 | Niggeman | |
| 5,967,461 A * | 10/1999 | Farrington | B64D 13/06 244/118.5 |
| 6,058,725 A | 5/2000 | Monfraix et al. | |
| 6,070,418 A | 6/2000 | Crabtree et al. | |
| 6,128,909 A | 10/2000 | Jonqueres | |
| 6,189,324 B1 | 2/2001 | Williams et al. | |
| 6,199,387 B1 | 3/2001 | Sauterleute | |
| 6,216,981 B1 | 4/2001 | Helm | |
| 6,257,003 B1 | 7/2001 | Hipsky | |
| 6,283,410 B1 | 9/2001 | Thompson | |
| 6,295,822 B1 | 10/2001 | Mueller | |
| 6,505,474 B2 | 1/2003 | Sauterleute et al. | |
| 6,519,969 B2 * | 2/2003 | Sauterleute | B64D 13/06 62/401 |
| 6,526,775 B1 | 3/2003 | Asfia et al. | |
| 6,615,606 B2 * | 9/2003 | Zywiak | B64D 13/06 62/402 |
| 6,681,592 B1 | 1/2004 | Lents et al. | |
| 6,776,002 B1 | 8/2004 | Ho | |
| 6,845,630 B2 | 1/2005 | Bruno | |
| 6,848,261 B2 * | 2/2005 | Claeys | B64D 13/06 62/259.2 |
| 7,017,365 B2 | 3/2006 | Haas et al. | |
| 7,059,136 B2 | 6/2006 | Coffinberry | |
| 7,222,499 B2 | 5/2007 | Hunt | |
| 7,380,749 B2 * | 6/2008 | Fucke | B64D 13/06 244/118.5 |
| 7,607,318 B2 | 10/2009 | Lui et al. | |
| 7,624,592 B2 * | 12/2009 | Lui | B64D 13/06 60/224 |
| 7,673,459 B2 | 3/2010 | Sheldon et al. | |
| 7,837,752 B2 | 11/2010 | Darke et al. | |
| 7,845,188 B2 | 12/2010 | Brutscher et al. | |
| 7,950,606 B2 | 5/2011 | Atkey et al. | |
| 7,980,928 B2 | 7/2011 | Markwart et al. | |
| 8,016,228 B2 * | 9/2011 | Fucke | B64D 13/06 244/118.5 |
| 8,042,354 B1 | 10/2011 | Dziorny et al. | |
| 8,099,973 B2 | 1/2012 | Sampson et al. | |
| 8,302,407 B2 | 11/2012 | Alecu | |
| 8,347,647 B2 | 1/2013 | Mcauliffe et al. | |
| 8,657,568 B2 | 2/2014 | McAuliffe et al. | |
| 8,807,929 B2 | 8/2014 | Koenigsegg | |
| 8,868,262 B2 | 10/2014 | Haillot | |
| 8,985,966 B2 | 3/2015 | Sampson et al. | |
| 9,103,568 B2 * | 8/2015 | Beers | F25B 9/06 |
| 9,109,514 B2 * | 8/2015 | Cheong | F02C 7/185 |
| 9,151,218 B2 | 10/2015 | Ebisu | |
| 9,169,024 B2 | 10/2015 | Voinov | |
| 9,188,065 B2 | 11/2015 | Dede et al. | |
| 9,205,925 B2 | 12/2015 | Bruno et al. | |
| 9,211,954 B2 | 12/2015 | Barkowsky | |
| 9,221,543 B2 | 12/2015 | Kelnhofer | |
| 9,481,468 B1 | 11/2016 | Schiff | |
| 9,487,300 B2 | 11/2016 | Klimpel et al. | |
| 9,555,893 B2 * | 1/2017 | Squier | B64D 13/08 |
| 9,669,936 B1 * | 6/2017 | Fiterman | B64D 13/06 |
| 9,849,990 B2 | 12/2017 | Bruno | |
| 10,059,458 B2 * | 8/2018 | Squier | B64D 13/08 |
| 10,137,993 B2 | 11/2018 | Bruno et al. | |
| 10,144,517 B2 | 12/2018 | Bruno et al. | |
| 10,232,948 B2 | 3/2019 | Bruno et al. | |
| 10,457,399 B2 | 10/2019 | Bammann et al. | |
| 10,457,401 B2 * | 10/2019 | Feulner | F02C 7/277 |
| 10,486,817 B2 | 11/2019 | Bruno et al. | |
| 10,597,162 B2 | 3/2020 | Bruno et al. | |
| 10,604,263 B2 | 3/2020 | Bruno et al. | |
| 10,683,803 B2 | 6/2020 | Berti et al. | |
| 10,773,807 B2 | 9/2020 | Hall et al. | |
| 10,870,490 B2 | 12/2020 | Bruno et al. | |
| 11,047,237 B2 | 6/2021 | Bruno et al. | |
| 2001/0004837 A1 * | 6/2001 | Sauterleute | B64D 13/06 62/402 |
| 2003/0051500 A1 | 3/2003 | Asfia | |
| 2003/0126880 A1 * | 7/2003 | Zywiak | B64D 13/06 62/402 |
| 2004/0014418 A1 | 1/2004 | Farag et al. | |
| 2004/0014419 A1 | 1/2004 | Lents et al. | |
| 2004/0055309 A1 | 3/2004 | Bellows | |
| 2004/0195447 A1 * | 10/2004 | Claeys | B64D 13/06 244/118.5 |
| 2006/0059927 A1 | 3/2006 | Zywiak et al. | |
| 2006/0059942 A1 | 3/2006 | McAuliffe et al. | |
| 2006/0196216 A1 | 9/2006 | Bruno et al. | |
| 2007/0111650 A1 | 5/2007 | Lerche | |
| 2007/0266695 A1 * | 11/2007 | Lui | B64D 13/06 60/204 |
| 2009/0117840 A1 | 5/2009 | Kresser | |
| 2009/0317248 A1 | 12/2009 | Tanaka et al. | |
| 2010/0043794 A1 | 2/2010 | Saito et al. | |
| 2010/0323601 A1 | 12/2010 | Cremers et al. | |
| 2011/0036335 A1 | 2/2011 | Wood et al. | |
| 2012/0114463 A1 | 5/2012 | Beers et al. | |
| 2012/0118528 A1 | 5/2012 | Al-Ali | |
| 2012/0156027 A1 * | 6/2012 | Merritt | F04D 29/441 415/207 |
| 2013/0033348 A1 | 2/2013 | Saito et al. | |
| 2013/0118190 A1 | 5/2013 | Bruno et al. | |
| 2013/0133348 A1 | 5/2013 | Squier | |
| 2013/0136590 A1 | 5/2013 | Higashimori | |
| 2013/0187007 A1 | 7/2013 | Mackin et al. | |
| 2014/0109603 A1 | 4/2014 | Fernandes et al. | |
| 2014/0144163 A1 | 5/2014 | Klimpel et al. | |
| 2014/0161698 A1 | 6/2014 | Klimpel | |
| 2014/0238043 A1 * | 8/2014 | Sokhey | F02K 1/36 60/805 |
| 2014/0250898 A1 | 9/2014 | Mackin et al. | |
| 2014/0353461 A1 | 12/2014 | Vignali et al. | |
| 2015/0013355 A1 | 1/2015 | Klimpel et al. | |
| 2015/0033730 A1 * | 2/2015 | Beers | B64D 13/06 60/456 |
| 2015/0065025 A1 | 3/2015 | Bruno et al. | |
| 2015/0251765 A1 | 9/2015 | Jonqueres et al. | |
| 2015/0251766 A1 | 9/2015 | Atkey | |
| 2015/0275844 A1 | 10/2015 | Winkler et al. | |
| 2015/0307195 A1 | 10/2015 | Bruno | |

(56) References Cited

U.S. PATENT DOCUMENTS

| | | | |
|---|---|---|---|
| 2015/0329210 A1 | 11/2015 | Bammann | |
| 2016/0083100 A1* | 3/2016 | Bammann | B64D 13/06 62/89 |
| 2016/0214727 A1* | 7/2016 | Hamel | B64C 21/06 |
| 2017/0021296 A1 | 1/2017 | Paul et al. | |
| 2017/0129614 A1 | 5/2017 | Bammann et al. | |
| 2017/0327235 A1* | 11/2017 | Feulner | F02C 3/04 |
| 2017/0341759 A1 | 11/2017 | Bruno et al. | |
| 2017/0341760 A1 | 11/2017 | Hall et al. | |
| 2017/0341761 A1 | 11/2017 | Bruno et al. | |
| 2017/0341767 A1 | 11/2017 | Bruno et al. | |
| 2017/0341768 A1 | 11/2017 | Bruno et al. | |
| 2017/0342838 A1 | 11/2017 | Bruno et al. | |
| 2017/0342899 A1 | 11/2017 | Bruno et al. | |
| 2018/0051945 A1 | 2/2018 | Hanov et al. | |
| 2018/0057175 A1 | 3/2018 | Klimpel et al. | |
| 2018/0148179 A1 | 5/2018 | Bruno | |
| 2018/0162536 A1 | 6/2018 | Army et al. | |
| 2019/0002111 A1 | 1/2019 | Bruno et al. | |
| 2020/0010202 A1* | 1/2020 | Bammann | B64D 13/06 |
| 2020/0189749 A1 | 6/2020 | Ho et al. | |
| 2021/0047044 A1 | 2/2021 | Bruno et al. | |

FOREIGN PATENT DOCUMENTS

| | | |
|---|---|---|
| CN | 1032857 A | 5/1989 |
| CN | 1902090 A | 1/2007 |
| CN | 101050726 A | 10/2007 |
| CN | 101148197 A | 3/2008 |
| CN | 101372260 A | 2/2009 |
| CN | 101522522 A | 9/2009 |
| CN | 101743166 A | 6/2010 |
| CN | 101994615 A | 3/2011 |
| CN | 102182490 A | 9/2011 |
| CN | 102910293 A | 2/2013 |
| CN | 102971215 A | 3/2013 |
| CN | 103003527 A | 3/2013 |
| CN | 103010466 A | 4/2013 |
| CN | 103079956 A | 5/2013 |
| CN | 103108805 A | 5/2013 |
| CN | 103832593 A | 6/2014 |
| CN | 103863569 A | 6/2014 |
| CN | 104395583 A | 3/2015 |
| CN | 104514636 A | 4/2015 |
| CN | 105129095 A | 12/2015 |
| CN | 105438481 A | 3/2016 |
| DE | 69909149 T2 | 4/2004 |
| EP | 1112930 A2 | 7/2001 |
| EP | 1129941 A2 | 9/2001 |
| EP | 1386837 | 2/2004 |
| EP | 1555205 A2 | 7/2005 |
| EP | 2597036 A2 | 5/2013 |
| EP | 2602191 A1 | 6/2013 |
| EP | 2845804 A1 | 3/2015 |
| EP | 2937287 A1 | 10/2015 |
| EP | 2947012 A1 | 11/2015 |
| GB | 2355520 A | 4/2001 |
| JP | 5909163 B2 | 4/2016 |
| WO | 03035472 A1 | 5/2003 |
| WO | 2016004021 A1 | 1/2016 |

OTHER PUBLICATIONS

Search Report dated Oct. 5, 2017 in European Patent Application No. 17172816.
Search Report dated Oct. 6, 2017 in European Patent Application No. 17172822.
Search Report dated Oct. 9, 2017 in European Patent Application No. 17172889.
Search Report dated Oct. 11, 2017 in European Patent Application No. 17172834.
Search Report dated Oct. 20, 2017 in European Patent Application No. 17172830.
Search Report dated Oct. 20, 2017 in European Patent Application No. 17172757.
Search Report dated Oct. 25, 2017 in European Patent Application No. 17173043.
Search Report dated Nov. 2, 2017 in European Patent Application No. 17172891.
Search Report dated Nov. 10, 2017 in European Patent Application No. 17172821.
Extended Search Report dated Jun. 7, 2018 in European Patent Application No. 17204787.
European Office Action for European Patent Application No. 17172757.1 dated Nov. 30, 2018; 7 Pages.
European Search Report Issued in EP Application No. 17172830.6 dated Oct. 20, 2017; 9 Pages.
European Search Report Issued in European Application No. 17172757.1 dated Oct. 20, 2017; 10 Pages.
European Search Report Issued in European Application No. 17172822.3 dated Oct. 6, 2017; 8 Pages.
European Search Report Issued in European Application No. 17172834.8 dated Oct. 11, 2017; 10 Pages.
European Search Report Issued in European Application No. 17172889.2 dated Oct. 9, 2017; 10 Pages.
European Search Report Issued in European Application No. 17172891.8 dated Nov. 2, 2017; 9 Pages.
European Search Report Issued in European Application No. 17173043.5 dated Oct. 25, 2017; 9 Pages.
European Search Report Issued in European Application No. 17204787.0 dated Jun. 7, 2018; 7 Pages.
European Office Action; International Application No. 17173077.3-1007; International Filing Date: May 26, 2017; dated Sep. 9, 2020; 6 pages.
Communication pursuant to Article 94(3) EPC; International Application No. 17172891.8-1010; International Filing Date: May 24, 2017; dated Feb. 9, 2021; 4 pages.
Extended European Seacrh Report; International Application No. 20210933.6-1017; International Filing Date: Dec. 1, 2020; dated Apr. 29, 2021; 47 pages.
EPO Official Letter for Application No. 17204787.0, dated May 6, 2021, 5 pages.
First Office Action; Chinese Application No. 201710382553.1; dated May 8, 2021; 6 pages.
First Office Action; Chinese Application No. 201710385862.4; International Filing Date: May 26, 2017; dated Apr. 16, 2021; 14 pages with translation.
First Office Action; Chinese Application No. 201710387590.1; dated Apr. 27, 2021; 10 pages.
First Office Action; Chinese Application No. 201710387601.6; dated Apr. 19, 2021; 8 pages.
European Office Action; European Application No. 17 172 822.3; dated Aug. 19, 2021; 5 pages.
European Office Action; European Application No. 17172757.1; dated Nov. 3, 2021; 7 pages.
European Office Action; European Application No. 17172816.5; dated Aug. 19, 2021; 5 pages.
First Chinese Office Action; Appliation No. CN 201710384526.8; dated Nov. 1, 2021 ; 6 pages.
First Chinese Office Action; Appliation No. CN 201710387602.0; dated Oct. 12, 2021; 8 pages.
First Chinese Office Action; Appliation No. CN 201710387603.5; dated Oct. 12, 2021; 8 pages.
First Chinese Office Action; Appliation No. CN 201710396154; dated Sep. 13, 2021; 7 pages.
First Chinese Office Action; Appliation No. CN 201710411519.2; dated Sep. 14, 2021; 4 pages.
First Chinese Office Action; Application No. 201710387280.X; dated Sep. 15, 2021; 6 pages.
First Chinese Office Action; Application No. CN 201710387279.7; dated Sep. 13, 2021; 6 pages.
Second Chinese Office Action; Appliation No. CN 201710385862.4; dated Dec. 8, 2021 ; 5 pages.
Second Chinese Office Action; Appliation No. CN 201710387590.1; dated Dec. 16, 2021 ; 7 pages.

(56) References Cited

OTHER PUBLICATIONS

Second Chinese Office Action; Appliation No. CN 201710387601. 6; dated Nov. 2, 2021 ; 3 pages.
U.S. NonFinal Office Action; U.S. Appl. No. 15/604,397; filed May 24, 2017; dated Sep. 7, 2021; 23 pages.
Abstract of CN101148197, Published Mar. 26, 2008, 1 page.
Abstract of CN102182490, Published Sep. 14, 2011, 1 page.
Brazilian Search Report and Written Opinion for Application No. BR102017010900-3, dated Jan. 25, 2022, 4 pages.
Brazilian Search Report and Written Opinion for Application No. BR102017010903-8, dated Jan. 25, 2022, 4 pages.
Brazilian Search Report and Written Opinion for Application No. BR102017011079-6, dated Jan. 25, 2022, 4 pages.
Brazilian Search Report and Written Opinion for Application No. BR102017011080-0, dated Jan. 25, 2022, 4 pages.
Brazilian Search Report and Written Opinion for Application No. BR102017011081-8, dated Jan. 25, 2022, 4 pages.
Brazilian Search Report and Written Opinion for Application No. BR102017011083-4, dated Jan. 25, 2022, 4 pages.
Brazilian Search Report and Written Opinion for Application No. BR102017011086-9, dated Jan. 25, 2022, 4 pages.
Brazilian Search Report and Written Opinion for Application No. BR102017011087-7 dated Jan. 25, 2022, 4 pages.
Brazilian Search Report and Written Opinion for Application No. BR102017011088-5, dated Jan. 25, 2022, 4 pages.
Brazilian Search Report and Written Opinion for Application No. BR102017011090-7, dated Jan. 25, 2022, 4 pages.
Brazilian Search Report and Written Opinion for Application No. BR102017011091-5, dated Jan. 25, 2022, 4 pages.
Brazilian Written Opinion for Application No. BR102017010900-3, dated Jan. 25, 2022, 2 pages (in English).
Brazilian Written Opinion for Application No. BR102017010903-8, dated Jan. 25, 2022, 2 pages (in English).
Brazilian Written Opinion for Application No. BR102017011079-6, dated Jan. 25, 2022, 2 pages (in English).
Brazilian Written Opinion for Application No. BR102017011080-0, dated Jan. 25, 2022, 2 pages (in English).
Brazilian Written Opinion for Application No. BR102017011081-8, dated Jan. 25, 2022, 2 pages (in English).
Brazilian Written Opinion for Application No. BR102017011083-4, dated Jan. 25, 2022, 2 pages (in English).
Brazilian Written Opinion for Application No. BR102017011086-9, dated Jan. 25, 2022, 2 pages (in English).
Brazilian Written Opinion for Application No. BR102017011087-7 dated Jan. 25, 2022, 2 pages, (in English).
Brazilian Written Opinion for Application No. BR102017011088-5, dated Jan. 25, 2022, 2 pages (in English).
Brazilian Written Opinion for Application No. BR102017011090-7, dated Jan. 25, 2022, 2 pages (in English).
Brazilian Written Opinion for Application No. BR102017011091-5, dated Jan. 25, 2022, 2 pages (in English).

* cited by examiner

FIG. 11
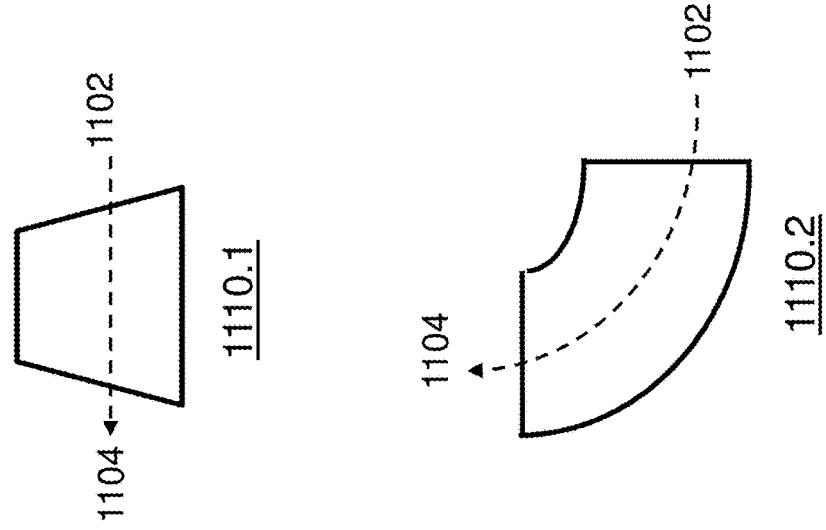
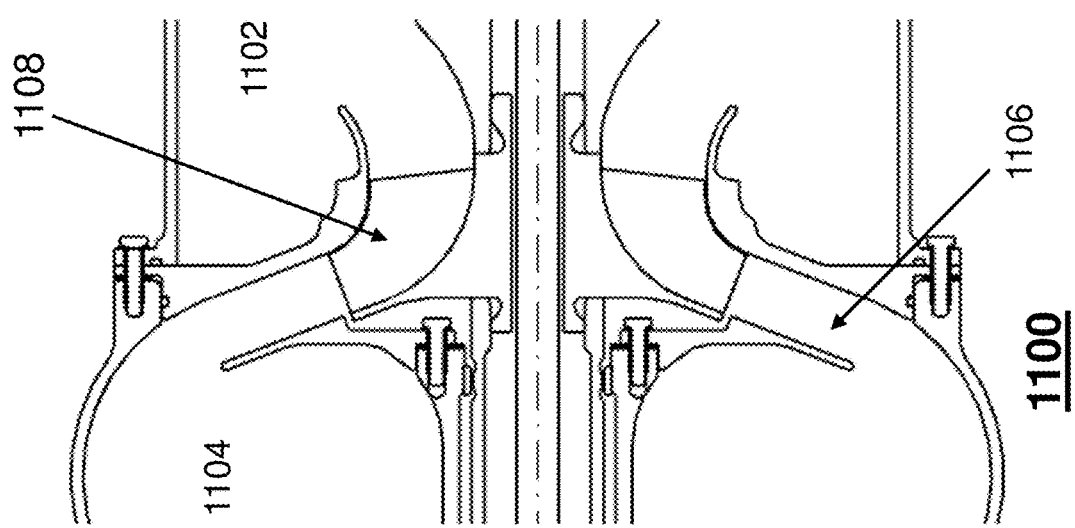

MIXING RAM AND BLEED AIR IN A DUAL ENTRY TURBINE SYSTEM

CROSS-REFERENCE TO RELATED APPLICATION

This application claims benefit of priority to U.S. Provisional Application No. 62/341,851 filed May 26, 2016, the disclosure of which is incorporated herein by reference in its entirety.

BACKGROUND

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring it into the cabin

BRIEF DESCRIPTION

According to one embodiment, an air cycle machine for an environmental control system of an aircraft is provided. The air cycle machine comprises a turbine comprising a plurality of inlet gas flow paths; a compressor driven by the turbine from a shaft; and a fan driven by the turbine from the shaft.

According to one or more embodiments or the air cycle machine embodiment above, the turbine can be located on a first end of the shaft.

According to one or more embodiments or any of the air cycle machine embodiments above, the fan can be located on a second end of the shaft.

According to one or more embodiments or any of the air cycle machine embodiments above, the compressor can be located on the shaft between the turbine and the fan.

According to one or more embodiments or any of the air cycle machine embodiments above, the plurality of inlet gas flow paths can comprise an inner flow path and an outer flow path.

According to one or more embodiments or any of the air cycle machine embodiments above, the turbine inner flow path can be a first diameter and the turbine outer flow path can be at a second diameter.

According to one or more embodiments or any of the air cycle machine embodiments above, the air cycle machine can comprise a power turbine.

According to one or more embodiments or any of the air cycle machine embodiments above, the power turbine can be located on the shaft between the fan and compressor.

According to one or more embodiments or any of the air cycle machine embodiments above, the power turbine can be located on the shaft between the turbine and compressor.

According to one or more embodiments, an air conditioning system is provided. The air conditioning system can comprise a first turbine comprising a plurality of inlet gas flow paths; a compressor driven by the first turbine from a shaft; a second turbine; and a fan driven by the second turbine.

According to one or more embodiments or the air conditioning system embodiment above, the first turbine can be located on a first end of the shaft.

According to one or more embodiments or any of the air conditioning system embodiments above, the compressor can be located on a second end of the shaft.

According to one or more embodiments or any of the air conditioning system embodiments above, the second turbine and the fan can be an integral rotor.

According to one or more embodiments or any of the air conditioning system embodiments above, the air conditioning system can comprise a second shaft coupling the fan and the second turbine.

According to one or more embodiments or any of the air conditioning system embodiments above, the air conditioning system can comprise a power turbine.

According to one or more embodiments or any of the air conditioning system embodiments above, the power turbine can be located on the shaft between the compressor and the first turbine.

According to one or more embodiments or any of the air conditioning system embodiments above, the first turbine can be located on a first end of the shaft.

According to one or more embodiments or any of the air conditioning system embodiments above, the power turbine can be located on a second end of the connect shaft.

According to one or more embodiments or any of the air conditioning system embodiments above, the compressor can be located between the first turbine and the power turbine.

According to one or more embodiments, an air conditioning system is provided. The air conditioning system can comprise a turbine comprising a plurality of inlet gas flow paths; a compressor driven by the turbine via a shaft; a motor; and a fan driven by the motor.

According to one or more embodiments or the air conditioning system embodiment above, the turbine can be located on a first end of the shaft.

According to one or more embodiments or any of the air conditioning system embodiments above, the compressor can be located on a second end of the shaft.

According to one or more embodiments or any of the air conditioning system embodiments above, the air conditioning system can comprise a power turbine.

According to one or more embodiments or any of the air conditioning system embodiments above, the power turbine can be is located on a first end of the shaft.

According to one or more embodiments or any of the air conditioning system embodiments above, the power turbine can be located on the shaft between the turbine and the compressor.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

FIG. 11 is a diagram of schematics of a mixed flow channel according to an embodiment.

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources and uses the different energy sources to power the environmental control system and to provide cabin pressurization and cooling at a high fuel burn efficiency. The medium can generally be air, while other examples include gases, liquids, fluidized solids, or slurries.

Figure 1:
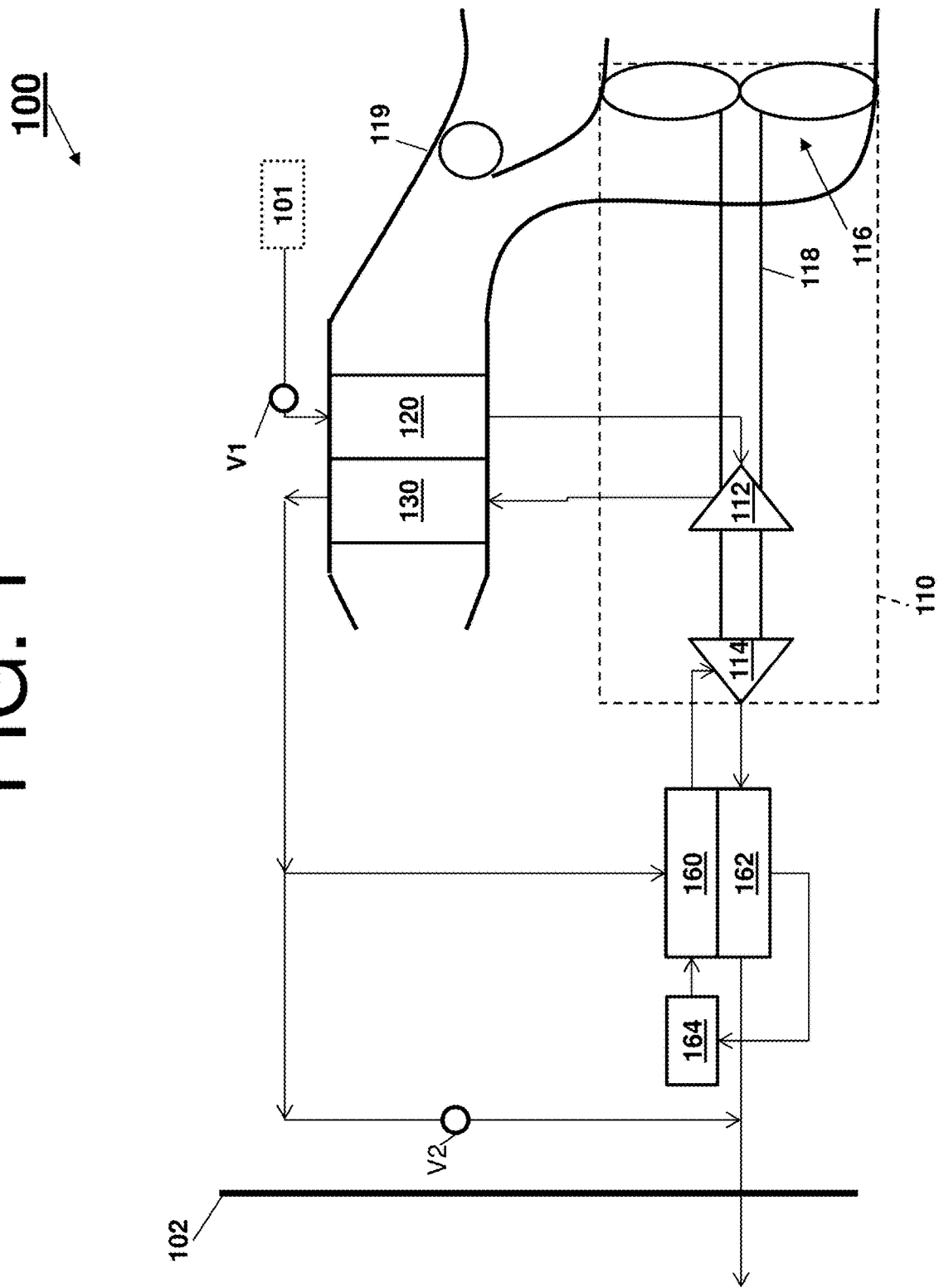
FIG. 1 is a diagram of an schematic of an environmental control system according to an embodiment.

Turning to FIG. 1, a system 100 that receives a medium from an inlet 101 and provides a conditioned form of the medium to a chamber 102 is illustrated. The system 100 comprises a compressing device 110. As shown, the compressing device 110 comprises a compressor 112, a turbine 114, a fan 116, and a shaft 118. The system 100 also comprises a primary heat exchanger 120, a secondary heat exchanger 130, a condenser 162, a water extractor 164, and a reheater 160.

The compressing device 110 is a mechanical device that includes components for performing thermodynamic work on the medium (e.g., extracts work from or works on the medium by raising and/or lowering pressure and by raising and/or lowering temperature). Examples of the compressing device 110 include an air cycle machine, a three-wheel air cycle machine, a four-wheel air cycle machine, etc.

The compressor 112 is a mechanical device that raises the pressure of the medium received from the inlet 101. Examples of compressor types include centrifugal, diagonal or mixed-flow, axial-flow, reciprocating, ionic liquid piston, rotary screw, rotary vane, scroll, diaphragm, air bubble, etc. Further, compressors can be driven by a motor or the medium via the turbine 114.

The turbine 114 is mechanical device that drives the compressor 112 and the fan 116 via the shaft 118. The fan 116 (e.g., a ram air fan) is a mechanical device that can force via push or pull methods air through the shell 119 across the heat exchangers 120 and 130 at a variable cooling to control temperatures. The shell 119 receives and directs a medium (such as ram air) through the system 100.

The heat exchangers 120 and 130 are devices built for efficient heat transfer from one medium to another. Examples of heat exchangers include double pipe, shell and tube, plate, plate and shell, adiabatic wheel, plate fin, pillow plate, and fluid heat exchangers.

The condenser 162 and the reheater 160 are particular types of heat exchangers. The water extractor 164 is a mechanical device that performs a process of taking water from the medium. Together, the condenser 162, water extractor 164, and/or the reheater 160 can combine to be a high pressure water separator.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value.

As shown in FIG. 1, the medium can flow from an inlet 101 through the system 100 to a chamber 102, as indicated by solid-lined arrows. A valve V1 (e.g., a mass flow control valve) controls the flow of the medium from the inlet 101 to the system 100. Further, a valve V2 controls whether the flow of the medium from the secondary heat exchanger 130 bypasses the condenser 160 in accordance with a mode of the system 100. A combination of components of the system 100 can be referred to as an air conditioning pack or a pack. The pack can begin at a valve V1 and conclude as air exits the condenser 162.

The system 100 will now be described in view of the above aircraft embodiment. In the aircraft embodiment, the medium can be air and the system 100 can be an environmental control system. The air supplied to the environmental control system at the inlet 101 can be said to be "bled" from a turbine engine or an auxiliary power unit. When the air is being provided by the turbine engine or the auxiliary power unit connected to the environmental control system, such as from the inlet 101, the air can be referred to as bleed air. The temperature, humidity, and pressure of the bleed air vary widely depending upon a compressor stage and a revolutions per minute of the turbine engine.

Figure 2:
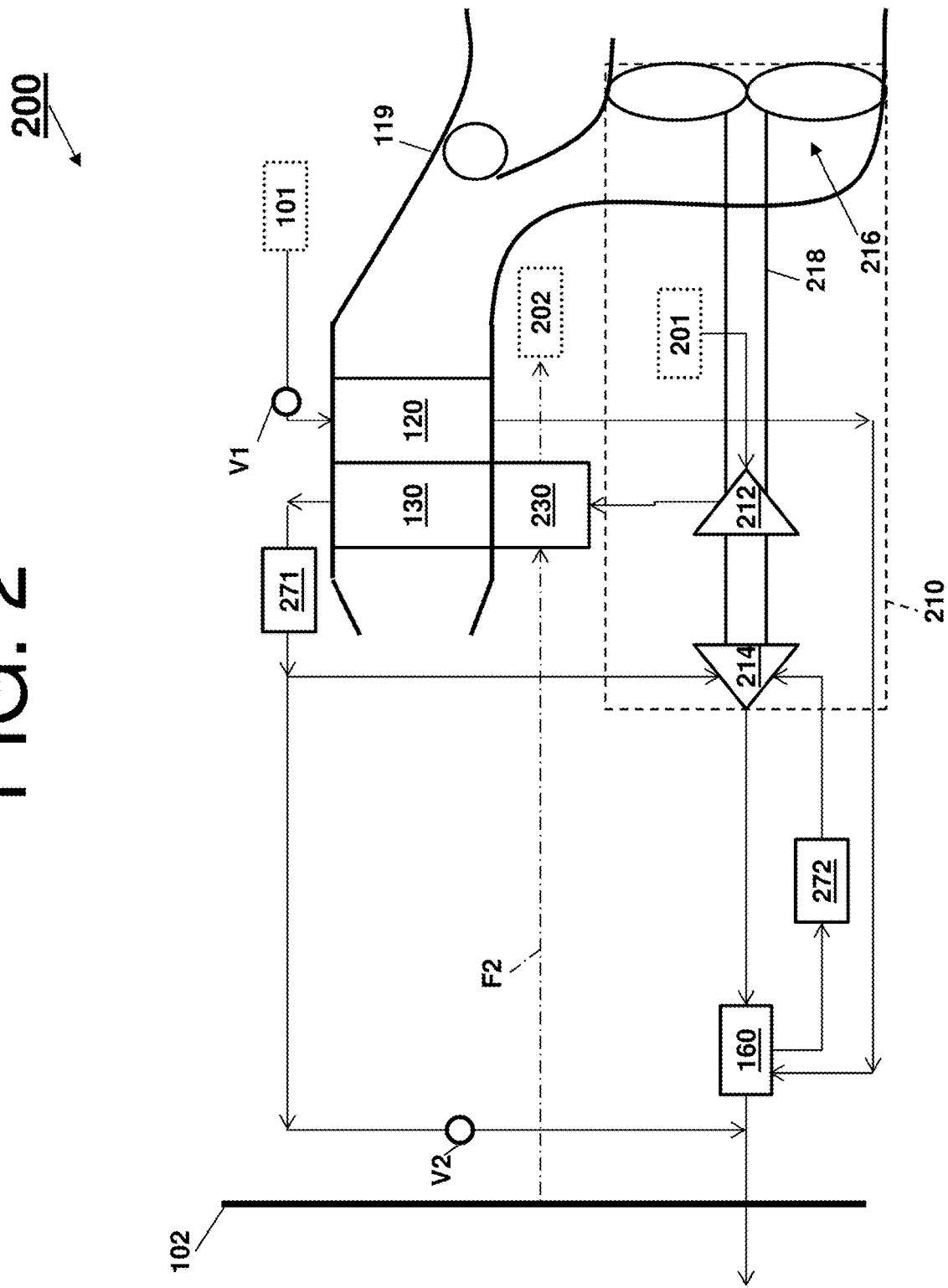
FIG. 2 is operation example of an environmental control system that mixes fresh air with bleed air according to an embodiment.

Turning now to FIG. 2, a schematic of an environmental control system 200 (e.g., an embodiment of system 100), as it could be installed on an aircraft, where in operation the environmental control system 200 mixes fresh air (e.g., a first medium) with bleed air (e.g., a second medium), is depicted according to an embodiment. Components of the system 100 that are similar to the environmental control system 200 have been reused for ease of explanation, by using the same identifiers, and are not re-introduced. Alternative components of the environmental control system 200 include an inlet 201, and outlet 202. Alternative components of the environmental control system 200 include a compressing device 210, which comprises a compressor 212, a turbine 214, a shaft 218, and a fan 216, along with an outflow heat exchanger 230, a water collector 271, and a water collector 272. Note that the environmental control system 200 provides a path for the medium denoted by the dot-dashed line F2 (where the medium can be provided from the chamber 102 into the environmental control system 200). Also note that the turbine 214 can be a dual use and/or a dual entry turbine. A dual use turbine is configured to receive flows of different mediums in the alternative. A duel entry turbine is configured with multiple nozzles that can receive flows of mediums at different entry point, such that multiple flows can be received simultaneously. For example, the turbine 214 can include a plurality of inlet gas flow paths, such as an inner flow path and an outer flow path, to enable mixing of alternative medium flows at the exit of the turbine 214. The inner flow path can be a first diameter, and the outer flow path can be a second diameter. The inner flow path can align with one of the first or second nozzles, and the outer flow path can align with the other of the first or second nozzles.

In view of the above aircraft embodiment, when a medium is being provided from the chamber 102 (e.g., a pressurized volume, cabin of the aircraft, or cabin and flight deck of the aircraft), the medium can be referred as chamber discharge air (also known as pressured air or cabin discharge air). Note that in one or more embodiments, an exhaust from the environmental control system 200 can be sent to an outlet (e.g., releases to ambient air through the shell 119).

Further, when a medium is being provided from the inlet 201, the medium can be referred to as fresh outside air (also known as fresh air or outside air). The fresh outside air can be procured from one or more scooping mechanisms, such as an impact scoop or a flush scoop. Thus, the inlet 201 can be considered a fresh air inlet.

In low altitude operation of the environmental control system 200, high-pressure high-temperature air from either the turbine engine or the auxiliary power unit via inlet 101 through the valve V1 enters the primary heat exchanger 120. The primary heat exchanger 120 cools the pressure high-temperature air to nearly ambient temperature to produce cool high pressure air. This cool high pressure air enters the condenser 160, where it is further cooled by air from the turbine 214 of the compressing device 210. Upon exiting the condenser 160, the cool high pressure air enters the water extractor 272 so that moisture in the air is removed.

The cool high pressure air enters the turbine 214 through a nozzle (e.g., a first nozzle). The cool high pressure air is expanded across the turbine 214 and work extracted from the cool high pressure air. This extracted work drives the compressor 212 used to compress fresh outside air. This extracted work also drives the fan 216, which is used to move air through the primary heat exchanger 120 and the secondary heat exchanger 130 (also known as ram air heat exchangers).

The act of compressing the fresh outside air, heats the fresh outside air. The compressed fresh outside air enters the outflow heat exchanger 230 and is cooled by the chamber discharge air to produce cooled compressed fresh outside air. The cooled compressed fresh outside air then enters the secondary heat exchanger 130 and is further cooled to nearly ambient temperature. The air exiting the secondary heat exchanger 130 then enters the water extractor 271, where any free moisture is removed, to produce cool medium pressure air. This cool medium pressure air then enters the turbine 214 through a nozzle (e.g., a second nozzle). The cool medium pressure air is expanded across the turbine 214 and work extracted from the cool high pressure air. Note that the chamber discharge air exiting from the outflow heat exchanger 230 can then be sent to an outlet 202. The outlet 202 can be a cabin pressure control system that utilized the energy of the chamber discharge air.

The two air flows (e.g., the fresh outside air sourcing from 201 and the bleed air sourcing from inlet 101) are mixed at an exit of the turbine 214 to produce mixed air. The exit of the turbine 214 can be considered a first mixing point of the environmental control system 200. The mixed air leaves the turbine 214 and enters the condenser 160 to cool the bleed air leaving the primary heat exchanger 120. The mixed air is then sent to condition the chamber 102.

This low altitude operation can be consider a low altitude mode. The low altitude mode can be used for ground and low altitude flight conditions, such as ground idle, taxi, take-off, and hold conditions.

In high altitude operation of the environmental control system 200, the fresh outside air can be mixed downstream of the turbine 214 (rather than at the exit of the turbine 214 or at the first mixing point). In this situation, the air exiting the water extractor 271 is the cool medium pressure air. This cool medium pressure air is directed by the valve V2 to downstream of the turbine 214 and/or downstream of the condenser 160. The location at which this cool medium pressure air mixes with the bleed air, which is sourced from the inlet 101 and exiting the condenser 160, can be considered a second mixing point of the environmental control system 200.

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101). Further, depending on an altitude of the aircraft, an amount of bleed air needed can be reduced. In this way, the environmental control system 200 provides bleed air reduction ranging from 40% to 75% to provide higher efficiencies with respect to engine fuel burn than contemporary airplane air systems.

Figure 3:
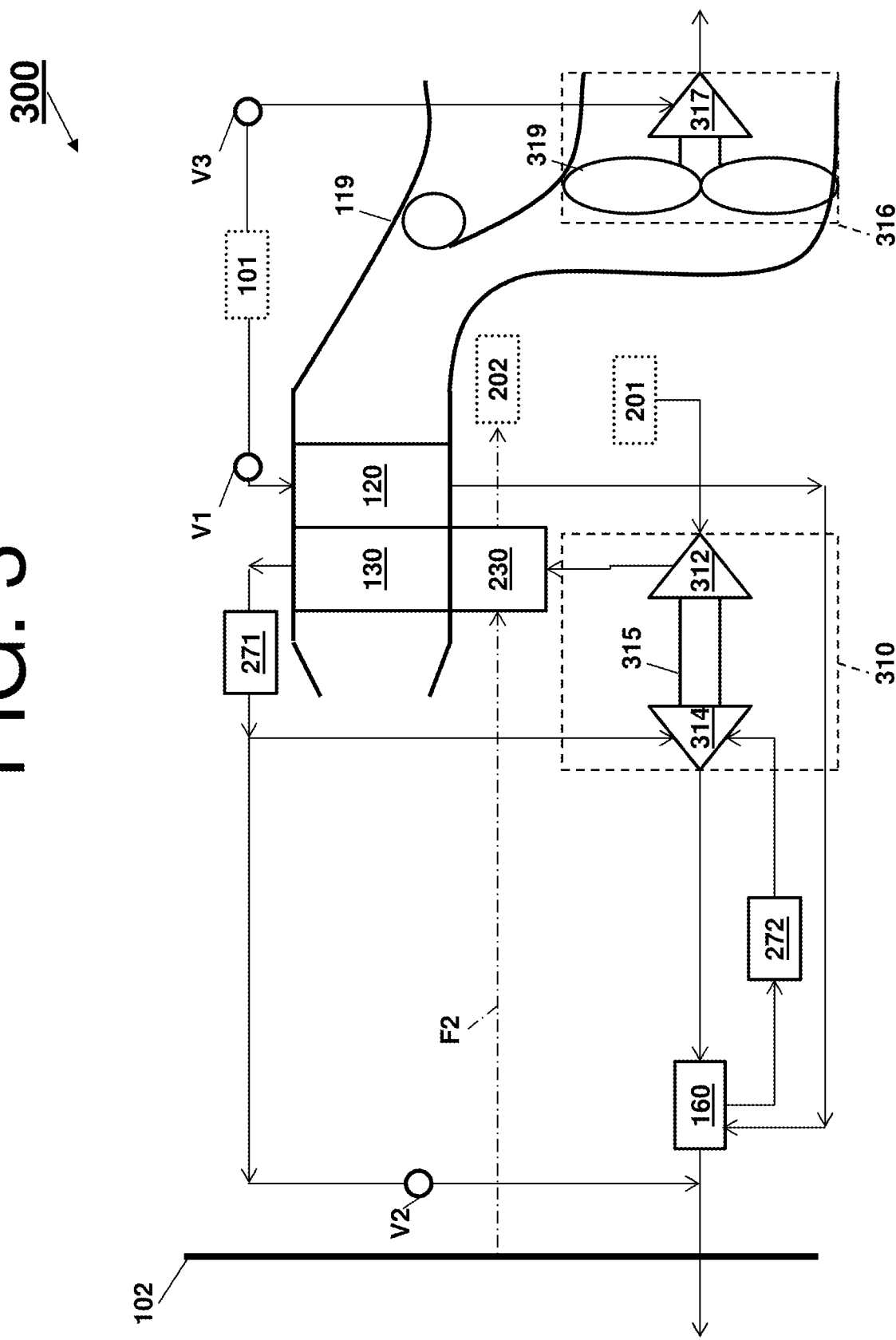
FIG. 3 is operation example of an environmental control system that mixes fresh air with bleed air, where the environmental control system includes a bleed air driven fan, according to an embodiment.
Figure 4:
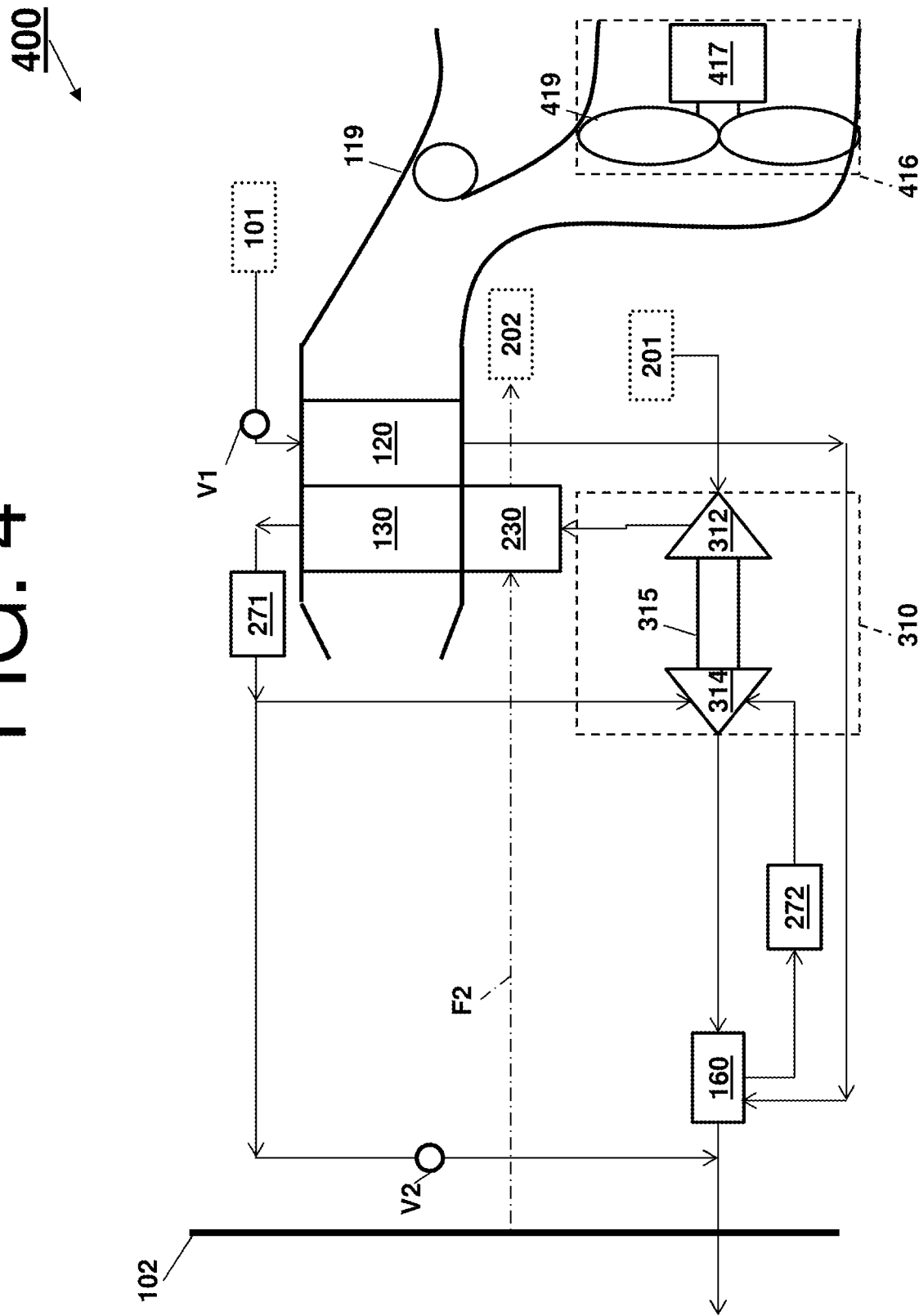
FIG. 4 is operation example of an environmental control system that mixes fresh air with bleed air, where the environmental control system includes an electrically driven fan, air according to an embodiment.

FIGS. 3 and 4 illustrate variations of the environmental control system 200. In general. Turning now to FIG. 3, a schematic of an environmental control system 300 (e.g., an embodiment of the environmental control system 200) is depicted according to an embodiment. Components of the systems 100 and 200 that are similar to the environmental control system 300 have been reused for ease of explanation, by using the same identifiers, and are not re-introduced. Alternative components of the environmental control system 300 include a compressing device 310, which comprises a compressor 312, a turbine 314, and a shaft 315, and a rotating device 316 (e.g., turbine driven fan), which comprises a turbine 317 and a fan 319, along with a secondary path for the medium sourced from the inlet 101 (e.g., a valve V3 can provide the medium from the inlet 101 to an inlet of the turbine 317). Note that the turbine 214 can be a dual use and/or a dual entry turbine.

The environmental control system 300 operates similarly to the environmental control system 200 in that different mixing points are utilized based on the mode of operation. In addition, the environmental control system 300 separates the ram air fan (e.g., fan 216) from the air cycle machine (e.g., the compressing device 210) and provides the ram air fan within the rotating device 316. The turbine 317 of the rotating device 316 is powered by the bleed air sourced from the inlet 101 flowing through the valve V3.

Turning now to FIG. 4, a schematic of an environmental control system 400 (e.g., an embodiment of the environmental control system 200) is depicted according to an embodiment. Components of the systems 100, 200, and 300 that are similar to the environmental control system 400 have been reused for ease of explanation, by using the same identifiers, and are not re-introduced. Alternative components of the environmental control system 400 include a rotating device 416, which comprises a motor 417 and a fan 419.

The environmental control system 400 operates similarly to the environmental control system 200 in that different mixing points are utilized based on the mode of operation. In addition, the environmental control system 400 separates the ram air fan (e.g., fan 216) from the air cycle machine (e.g., the compressing device 210) and provides the ram air fan within the rotating device 416. The motor 417 of the rotating device 416 is powered by electric power.

Figure 5:
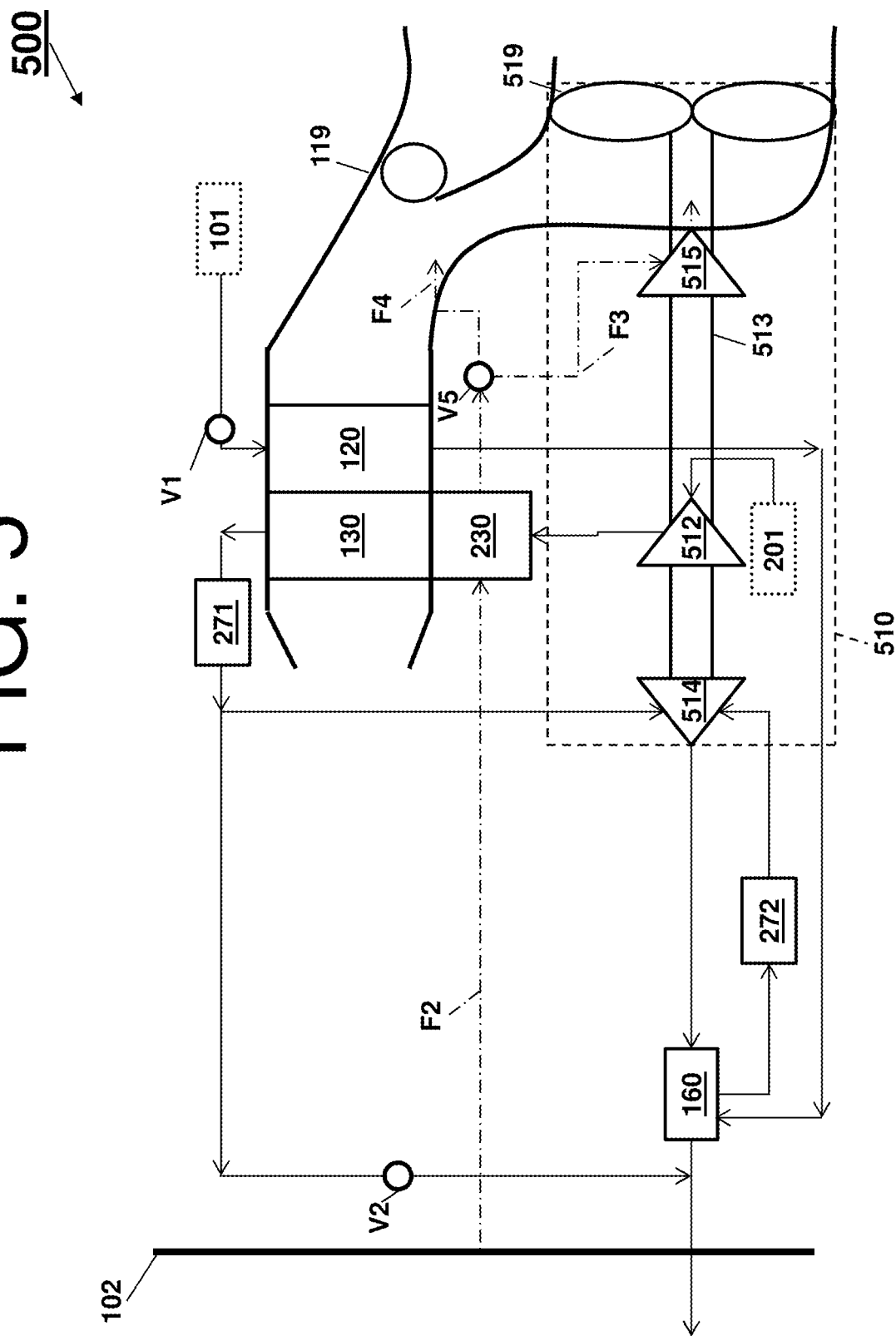
FIG. 5 is operation example of an environmental control system that mixes fresh air with bleed air according to another embodiment.

Turning now to FIG. 5, a schematic of an environmental control system 500 (e.g., an embodiment of system 100), as it could be installed on an aircraft, where in operation the environmental control system 500 mixes fresh air (e.g., a first medium) with bleed air (e.g., a second medium), is depicted according to an embodiment. Components of the systems 100, 200, 300, and 400 that are similar to the environmental control system 500 have been reused for ease of explanation, by using the same identifiers, and are not re-introduced. Alternative components of the environmental control system 500 include a compressing device 510 that comprises a compressor 512, a shaft 513, a turbine 514, and a turbine 515, along with paths for the medium denoted by the dot-dashed lines F3 and F4 (where the medium can be provided from the outflow heat exchanger 230 through a valve V5 to the shell 119 or the turbine 515). Note that the turbine 514 can be a dual use and/or a dual entry turbine.

In low altitude operation of the environmental control system 500, high-pressure high-temperature air from either the turbine engine or the auxiliary power unit via inlet 101 through the valve V1 enters the primary heat exchanger 120. The primary heat exchanger 120 cools the pressure high-temperature air to nearly ambient temperature to produce cool high pressure air. This cool high pressure air enters the condenser 160, where it is further cooled by air from the turbine 514 of the compressing device 510. Upon exiting the condenser 160, the cool high pressure air enters the water extractor 272 so that moisture in the air is removed.

The cool high pressure air enters the turbine 514 through a nozzle (e.g., a first nozzle). The cool high pressure air is expanded across the turbine 514 and work extracted from the cool high pressure air. This extracted work drives the compressor 512 used to compress fresh outside air. This extracted work also drives the fan 519, which is used to move air through the primary heat exchanger 120 and the secondary heat exchanger 130.

The act of compressing the fresh outside air, heats the fresh outside air. The compressed fresh outside air enters the outflow heat exchanger 230 and is cooled by the chamber discharge air to produce cooled compressed fresh outside air. The cooled compressed fresh outside air then enters the secondary heat exchanger 130 and is further cooled to nearly ambient temperature. The air exiting the secondary heat exchanger 130 then enters the water extractor 271, where any free moisture is removed, to produce cool medium pressure air. This cool medium pressure air then enters the turbine 514 through a nozzle (e.g., a second nozzle). The cool medium pressure air is expanded across the turbine 514 and work extracted from the cool high pressure air.

The two air flows (e.g., the fresh outside air sourcing from 201 and the bleed air sourcing from inlet 101) are mixed at an exit of the turbine 514 to produce mixed air. The exit of the turbine 514 can be considered a first mixing point of the environmental control system 200. The mixed air leaves the turbine 514 and enters the condenser 160 to cool the bleed air leaving the primary heat exchanger 120. The mixed air is then sent to condition the chamber 102.

This low altitude operation can be consider a low altitude mode. The low altitude mode can be used for ground and low altitude flight conditions, such as ground idle, taxi, take-off, and hold conditions.

In high altitude operation of the environmental control system 500, the fresh outside air can be mixed downstream of the turbine 514 (rather than at the exit of the turbine 514 or at the first mixing point). In this situation, the air exiting the water extractor 271 is the cool medium pressure air. This cool medium pressure air is directed by the valve V2 to downstream of the turbine 514 and/or downstream of the condenser 160. The location at which this cool medium pressure air mixes with the bleed air, which is sourced from the inlet 101 and exiting the condenser 160, can be considered a second mixing point of the environmental control system 500.

Further, energy in the cabin discharge air exiting from the outflow heat exchanger 230 is used to power the compressor 512 by feeding (e.g., the dot-dashed line F3) the cabin discharge air to the turbine 515. In this way, the additional or second turbine 515 included in the compressing device 510 can be fed hot air from the valve V5 (e.g., an outflow valve). In turn, the compressor 512 receives power from both the bleed air (via turbine 514) and the cabin discharge air (via turbine 515). If the energy is not chosen to be utilized, the cabin discharge air can be sent overboard through the shell 119, as shown by the dot-dashed line F4.

This high altitude operation can be considered a high altitude mode. The high altitude mode can be used at high altitude cruise, climb, and descent flight conditions. In the high altitude mode, fresh air aviation requirements for passengers are met by mixing the two air flows (e.g., the fresh outside air sourcing from 201 and the bleed air sourcing from inlet 101). Further, depending on an altitude of the aircraft, an amount of bleed air needed can be reduced. In this way, the environmental control system 500 provides bleed air reduction ranging from 40% to 75% to provide higher efficiencies with respect to engine fuel burn than contemporary airplane air systems.

Figure 6:
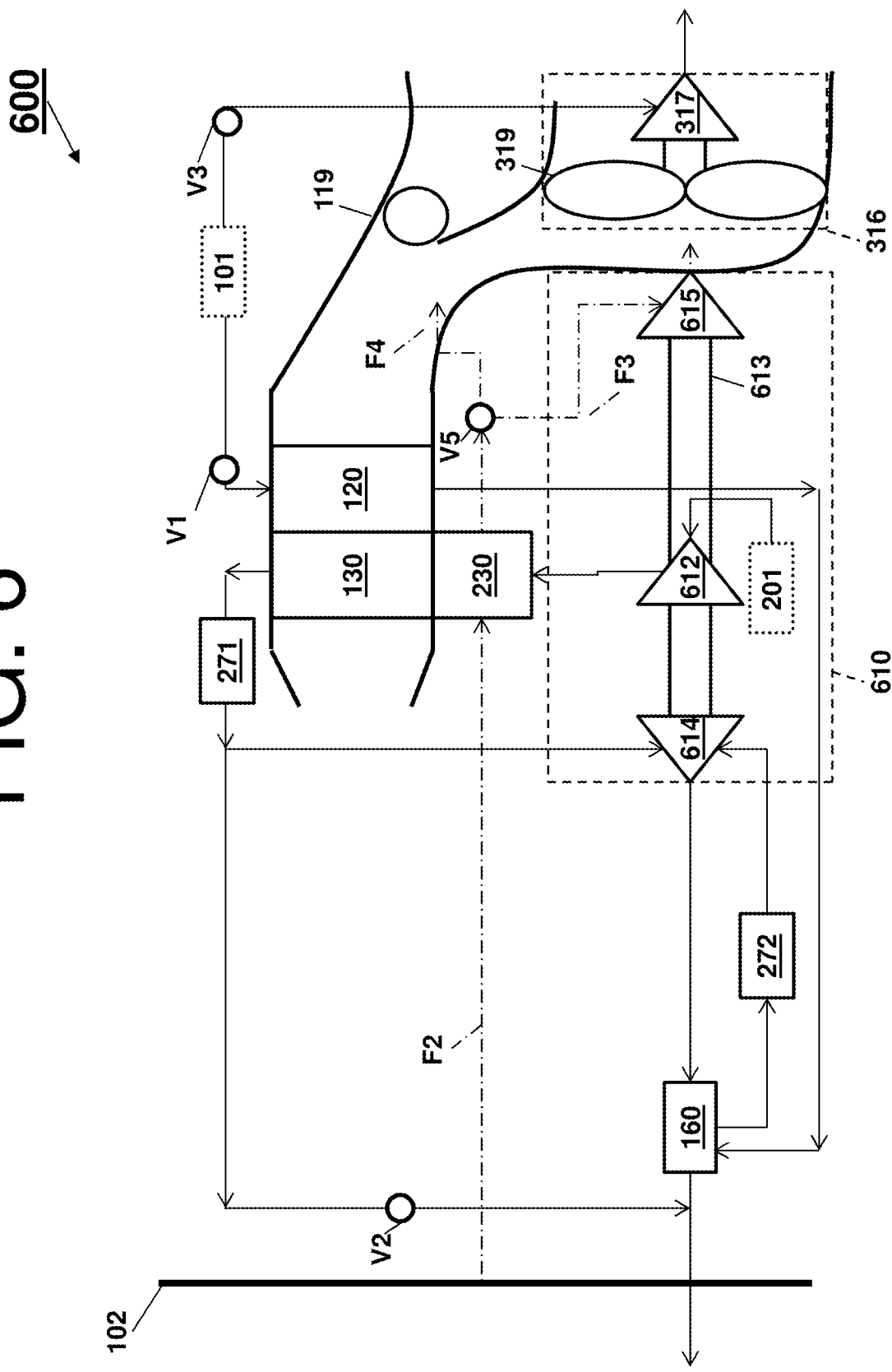
FIG. 6 is operation example of an environmental control system that mixes fresh air with bleed air, where the environmental control system includes a bleed air driven fan, according to another embodiment.
Figure 7:
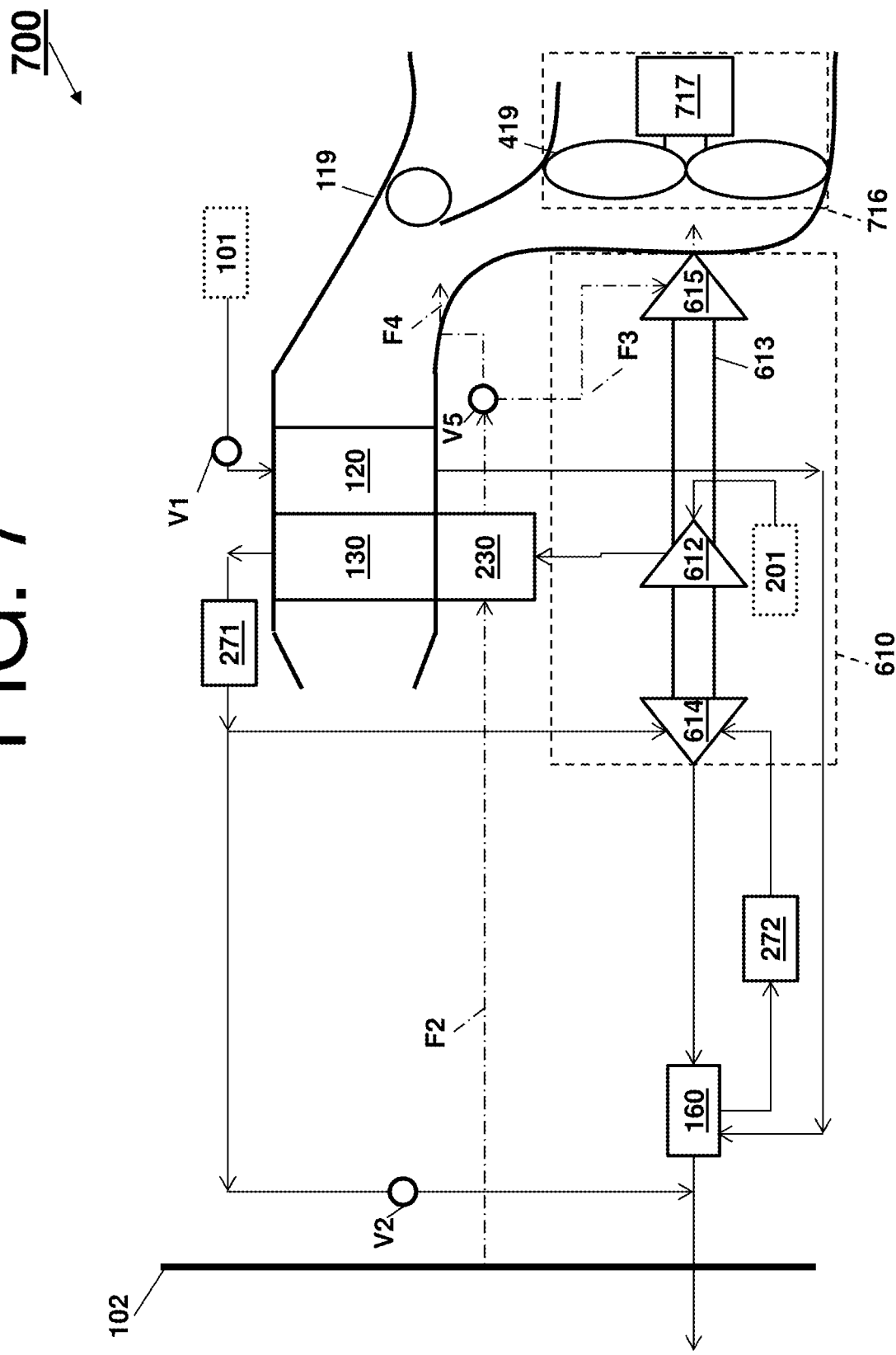
FIG. 7 is operation example of an environmental control system that mixes fresh air with bleed air, where the environmental control system includes an electrically driven fan, air according to another embodiment.

FIGS. 6 and 7 illustrate variations of the environmental control system 200. In general. Turning now to FIG. 6, a schematic of an environmental control system 600 (e.g., an embodiment of the environmental control system 500) is depicted according to an embodiment. Components of the systems 100, 200, 300, 400, and 500 that are similar to the environmental control system 600 have been reused for ease of explanation, by using the same identifiers, and are not re-introduced. Alternative components of the environmental control system 600 include a compressing device 610, which comprises a compressor 612, a shaft 613, a turbine 614, and a turbine 615 (where the turbine 615 can receive the medium from valve V5). Note that the turbine 614 can be a dual use and/or a dual entry turbine.

The environmental control system 600 operates similarly to the environmental control system 500 in that different mixing points are utilized based on the mode of operation. In addition, the environmental control system 600 separates the ram air fan (e.g., fan 319) from the air cycle machine (e.g., the compressing device 510) and provides the ram air fan within the rotating device 316. The turbine 317 of the rotating device 316 is powered by the bleed air sourced from the inlet 101 flowing through the valve V3.

Further, energy in the cabin discharge air exiting from the outflow heat exchanger 230 is used to power the compressor 612 by feeding (e.g., the dot-dashed line F3) the cabin discharge air to the turbine 615. In this way, the additional or second turbine 615 included in the compressing device 610 can be fed hot air from the valve V5 (e.g., an outflow valve). In turn, the compressor 612 receives power from both the bleed air (via turbine 614) and the cabin discharge air (via turbine 615). If the energy is not chosen to be utilized, the cabin discharge air can be sent overboard through the shell 119, as shown by the dot-dashed line F4.

Turning now to FIG. 7, a schematic of an environmental control system 700 (e.g., an embodiment of the environmental control system 500) is depicted according to an embodiment. Components of the systems 100, 200, 300, and 400 that are similar to the environmental control system 700 have been reused for ease of explanation, by using the same identifiers, and are not re-introduced.

The environmental control system 700 operates similarly to the environmental control system 500 in that different mixing points are utilized based on the mode of operation. In addition, the environmental control system 700 separates the ram air fan (e.g., fan 319) from the air cycle machine (e.g., the compressing device 510) and provides the ram air fan within the rotating device 716. The motor 717 of the rotating device 716 is powered by electric power.

In addition, the above systems 100, 200, 300, 400, 500, 600, and 700 can further utilize an enhanced compressor as the compressor 112 (or compressors 312, 512, and 612) to address compressor range concerns during operations of the system 100. For instance, embodiments herein provide an environmental control system that utilizes bleed pressures to power the environmental control system and to provide cabin pressurization and cooling at a high engine fuel burn efficiency, along with including the enhanced compressor that has high efficiency over a much wider corrected flow and pressure ratio range than the conventional centrifugal compressor. The enhanced compressor can include one or more of a compressor with high rotor backsweep, shroud bleed, and a low solidity diffuser; a variable vaned diffuser, and a mixed flow compressor. The enhanced compressor will now be described with respect to FIGS. 8-11.

Figure 8:
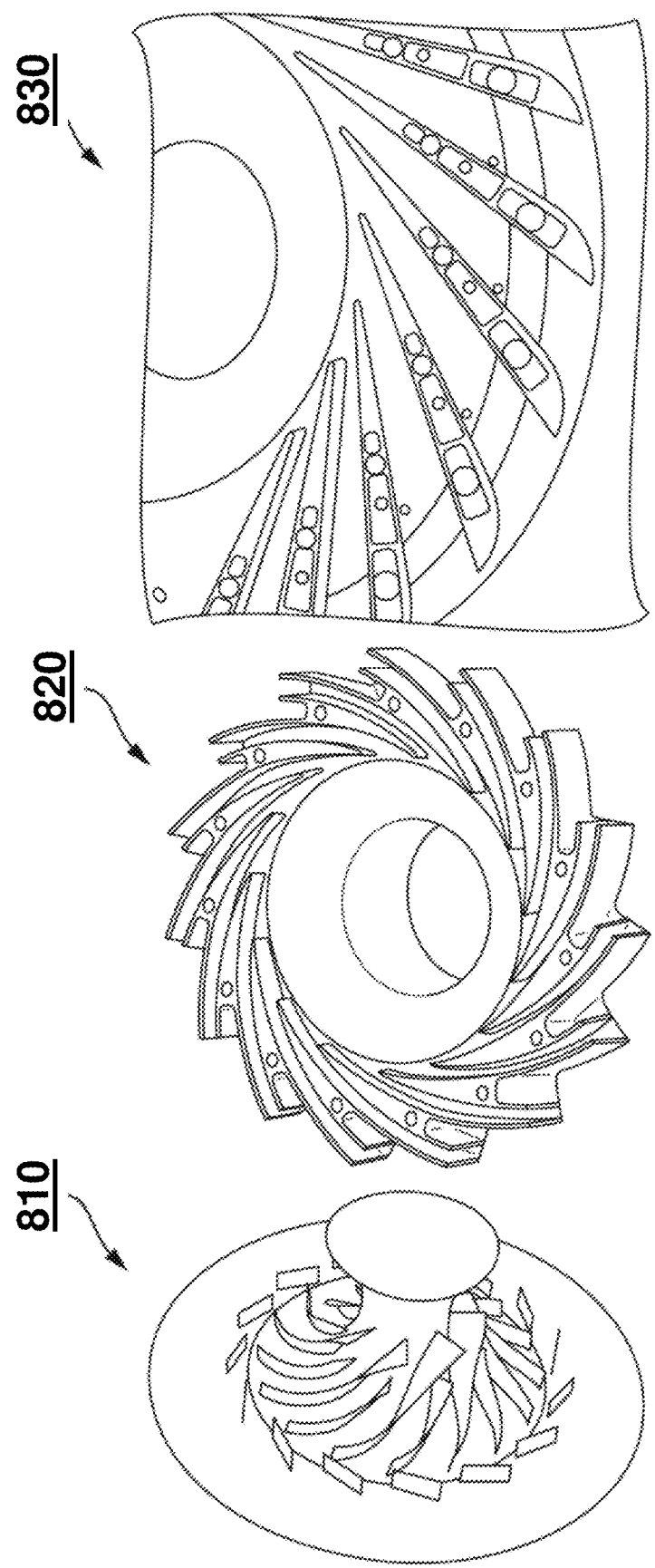
FIG. 8 is a diagram of schematics of diffusers of a compressing device according to an embodiment.

FIG. 8 is a diagram of schematics of diffusers of a compressing device according to an embodiment. FIG. 8 illustrates a plurality of diffusers, a schematic 810 of a low solidity diffuser, a schematic 820 of a curved channel diffusor, and a schematic 830 of a variable vaned diffuser. A diffuser converts the dynamic pressure of the medium flowing downstream of the rotor into static pressure rise by gradually slowing/diffusing a velocity of the medium (e.g., increases static pressure leaving the rotor). The diffuser can be vaneless, vaned or an alternating combination. As different diffuser types impact range and efficiency of the compressor 112 (or compressors 312, 512, and 612), one these diffusers 810, 820, and 830 can be utilized within the compressor 112 (or compressors 312, 512, and 612) (e.g., at position 1106 described below with respect to FIG. 11). The low solidity diffuser has a smaller number of vanes and provides a wide operating range with a lower efficiency. The curved channel diffuser extends arches each of the vanes and provides a narrow operating range with a high efficiency. The variable vaned diffuser comprises a plurality of vanes, each of which is configured to rotate about a pin as an articulating member moves the plurality of vanes, and provides a very high operating range with a high efficiency. Further, a single diffuser that has a combination of two or more of the diffusers 810, 820, and 830 can also be utilized.

Figure 9:
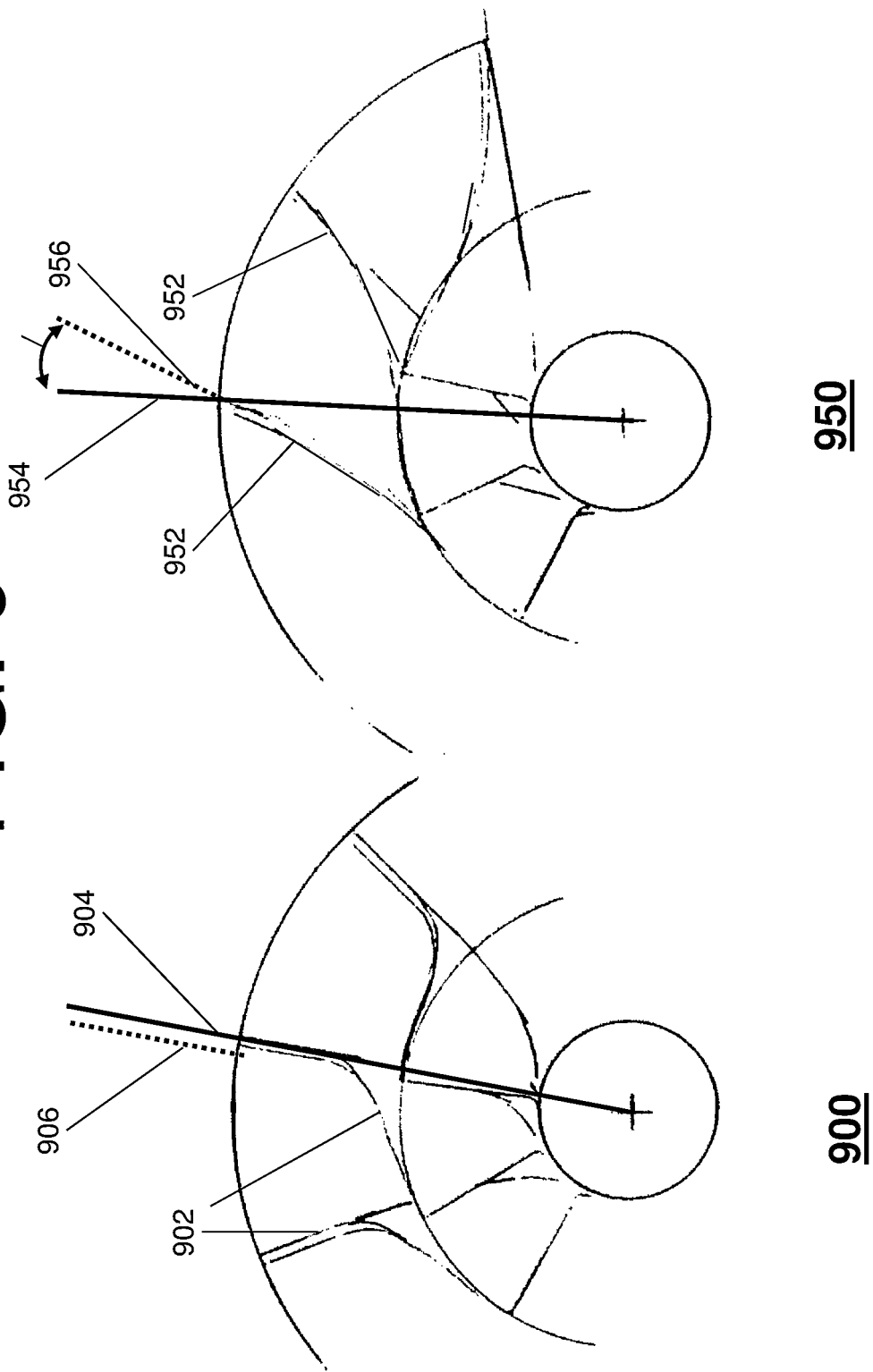
FIG. 9 is a diagram of schematics of compressor rotor backsweep according to an embodiment.
Figure 10:
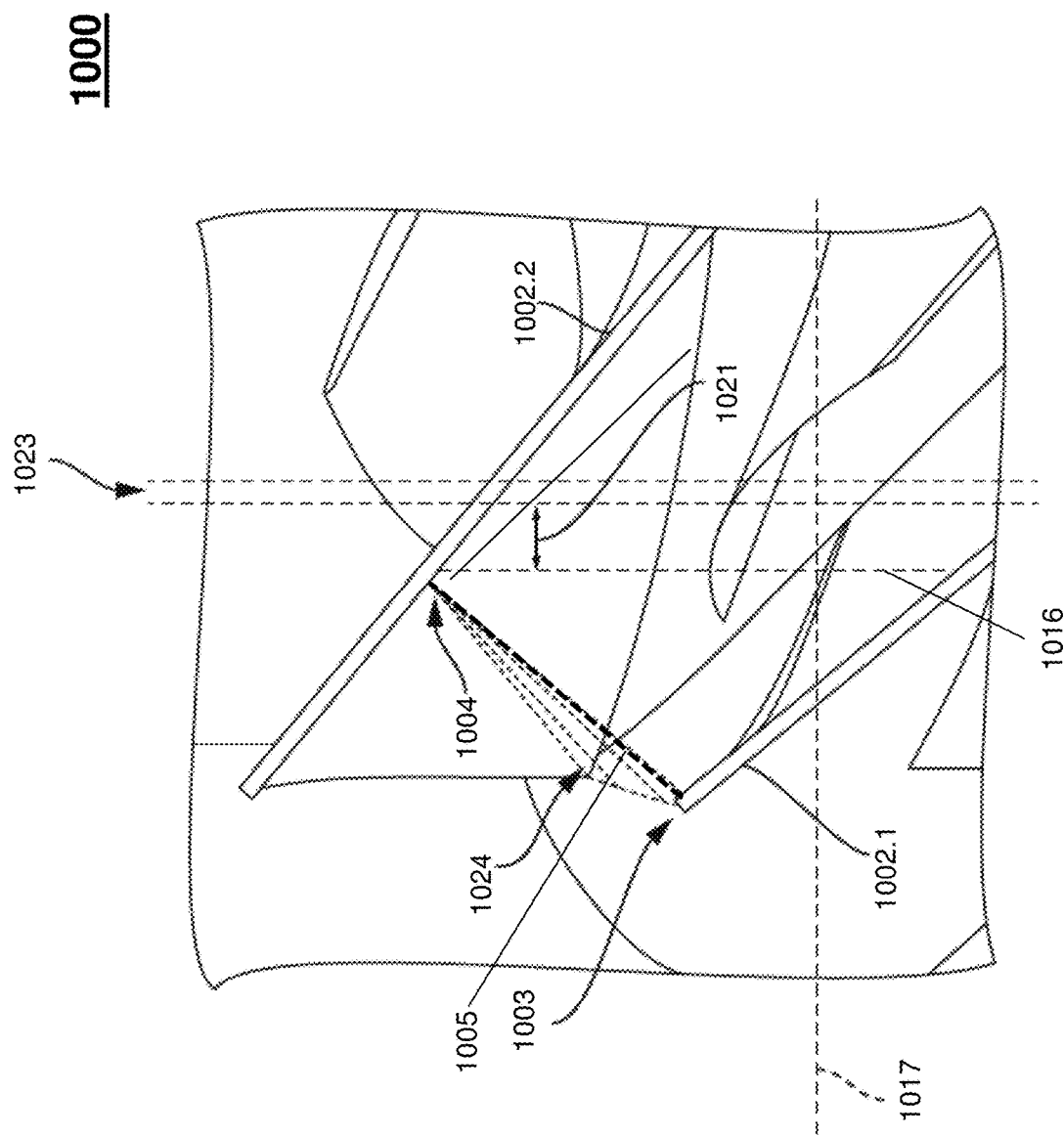
FIG. 10 illustrates a shroud bleed placement diagram according to an embodiment.

Turning now to FIGS. 9-10, the enhanced compressor will now be described with respect to the compressor 112 (or compressors 312, 512, and 612), including a high rotor backsweep with shroud bleed and a low solidity diffuser.

FIG. 9 is a diagram of schematics of a compressor rotor backsweep according to an embodiment. FIG. 9 illustrates a first rotor 900, with a plurality of blades 902, according to an embodiment. As illustrated, a reference line 904 extends radially from a center of the rotor 900. A dotted-line 906 tracks a direction of the rotor blade 902, if the rotor blade 902 were to be extended from a circumferential edge of the rotor 900. As shown, the direction of the rotor blade 902 (e.g., dotted-line 906) is in parallel with the reference line 904, which indicates no rotor backsweep.

FIG. 9 also illustrates a high rotor backsweep 950, with a plurality of blades 952, according to an embodiment. As illustrated, a reference line 954 extends radially from a center of the rotor 950. A dotted-line 956 tracks a direction of the rotor blade 952, if the rotor blade 952 were to be extended from a circumferential edge of the rotor 950. As shown, the direction of the rotor blade 952 (e.g., dotted-line 956) is not in parallel with the reference line 954, which indicates a rotor backsweep. The backsweep can be predetermined during manufacturing of the rotor, and can range from 0° to 90°. Embodiments of the backsweep include, but are not limited to, 0°, 30°, 42°, 45°, and 52°.

FIG. 10 illustrates a shroud bleed placement diagram 1000, which includes a plurality of demarcations and lines overlaying a greyed-out view of a portion of a rotor, according to an embodiment. As shown, rotor blades or impeller blades 1002 (e.g., impeller blades 1002.1 and 1002.2) bound a flow path. From a shroud tip 1003 of the impeller blade 1002.1 (i.e., an impeller blade leading edge) to a shroud suction surface 1004 of the impeller blade 1002.2 a throat 1005 of the flow path is formed. At a location where the throat 1005 contacts the shroud suction surface 1004 of the impeller blade 1002.2, a plane 1016 is formed. The plane 1016 is perpendicular to an axis of rotation 1017 of the rotor itself. The plane 1016 can be utilized to offset 1021 a shroud bleed 1023. In an embodiment, the offset 1021 can be selected from a range, such as a range from 0 to 0.90 inches.

The shroud bleed 1023 can be an opening for allowing a portion of a medium in the flow path to bleed out of or into the flow path instead of exiting the rotor. The shroud bleed 1023 can be a circumferentially located on a housing of the rotor. The shroud bleed 1023 can comprise one or more openings, each of which can be segmented at fixed or varying intervals, lengths, and/or patterns, to accommodate different bleed rates. The shroud bleed 1023 can be holes, slots, cuts, etc. The shroud bleed 1023 can be defined by an area, such as a total open area that is a percentage, e.g., 0 to 50% of a total rotor inlet throat area 1024. The total rotor inlet throat area 1024 is defined by the area 1024 between each pair of impeller blades 1002.

FIG. 11 is a diagram of schematics of a mixed flow channel according to an embodiment. FIG. 11 illustrates a cross section view 1100 of the compressor 112 (or compressors 312, 512, and 612). As shown in the cross section view 1100, the compressor 112 (or compressors 312, 512, and 612), comprises an inlet 1102 and an outlet 1104, which define a flow path. That is, the flow path between the inlet 1102 and the outlet 1104 is the mixed flow channel. The mixed flow channel can house a diffuser at position 1106 and a rotor at position 1108. A shape of the mixed flow channel can be selected to be between a range of a channel 1110.1 to a channel 1110.2. For instance, the channel 1110.1 is a straight flow path, where a flow of a medium through the channel 1110.1 is parallel to an axis of rotation of the rotor. Further, the channel 1110.2 is a bent flow path, where the flow of the medium through the channel 1110.2 begins at inlet 1102 in parallel with the axis of rotation of the rotor and ends at outlet 1104 perpendicular to the axis of rotation of the rotor.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An air cycle machine comprising:
   a turbine comprising a first nozzle that receives a bleed air flow from an aircraft turbine engine and a second nozzle that receives a fresh air flow;
   a shaft;
   a compressor driven by the turbine via the shaft and that receives and compresses the fresh air flow;
   a power turbine connected to the shaft and that receives cabin discharge air from an aircraft cabin after the discharge air has been heated in a heat exchanger by the fresh air flow after it leaves the compressor; and
   a fan driven by the shaft,
   wherein the bleed air flow enters the first nozzle of the turbine and the fresh air flow enters the second nozzle of the turbine after the fresh air flow leaves the compressor, wherein the fresh air flow is mixed with the bleed air flow in the turbine to create a mixed airflow that exits the turbine and enters the aircraft cabin.

2. The air cycle machine of claim 1, wherein the turbine is located on a first end of the shaft.

3. The air cycle machine of claim 2, wherein the fan is located on a second end of the shaft.

4. The air cycle machine of claim 3, wherein the compressor is located on the shaft between the turbine and the fan.

5. The air cycle machine of claim 1, wherein the power turbine is located between the fan and compressor.

6. The air cycle machine of claim 1, wherein the power turbine is located between the turbine and the fan.

7. An air conditioning system comprising:
   a first turbine comprising a first nozzle that receives a bleed air flow from an aircraft turbine engine and a second nozzle that receives a fresh air flow;
   a shaft;
   a compressor driven by the first turbine via the shaft and that receives and compresses the fresh air flow;
   a fan turbine;
   a power turbine connected to the shaft and that receives cabin discharge air from an aircraft cabin after the discharge air has been heated in a heat exchanger by the fresh air flow after it leaves the compressor; and
   a fan driven by the fan turbine,
   wherein the bleed air flow enters the first nozzle of the first turbine and fresh air flow enters the second nozzle of the first turbine after the fresh air flow leaves the compressor, wherein the fresh air flow is mixed with the bleed air flow in the first turbine to create a mixed airflow that exits the first turbine and enters the aircraft cabin.

8. The air conditioning system of claim 7, wherein the first turbine is located on a first end of the shaft.

9. The air conditioning system of claim 8, wherein the compressor is located on a second end of the shaft.

10. The air conditioning system of claim 8, wherein the power turbine is located on a second end of the shaft.

11. The air condition system of claim 10, wherein the compressor is located between the first turbine and the power turbine.

12. The air conditioning system of claim 7, wherein the fan turbine and the fan are an integral rotor.

13. The air conditioning system of claim 7, further comprising:
    a second shaft coupling the fan and the fan turbine.

14. An air conditioning system, comprising:
    a turbine comprising a first nozzle that receives a bleed air flow from an aircraft turbine engine and a second nozzle that receives a fresh air flow;
    a shaft;
    a compressor driven by the turbine via the shaft and that receives and compresses the fresh air flow;
    a power turbine connected to the shaft and that receives cabin discharge air from an aircraft cabin after the discharge air has been heated in a heat exchanger by the fresh air flow after it leaves the compressor;
    a motor; and
    a fan driven by the motor,
    wherein the bleed air flow enters the first nozzle of the turbine and the fresh air flow enters the second nozzle of the turbine after the fresh air flow leaves the compressor, wherein the fresh air flow is mixed with the bleed air flow in the turbine to create a mixed airflow that exits the turbine and enters the aircraft cabin.

15. The air conditioning system of claim 14, wherein the turbine is located on a first end of the shaft.

16. The air conditioning system of claim 15, wherein the compressor is located on a second end of the shaft.

17. The air conditioning system of claim 14, wherein the power turbine is located on a first end of the shaft.

18. The air conditioning system of claim 14 wherein the power turbine is located on a second end of the shaft.

* * * * *